Feb. 10, 1970　　　T. W. CLEMENTS　　　3,494,207
INTEGRATOR

Filed Jan. 31, 1968　　　　　　　　　　2 Sheets-Sheet 1

INVENTOR:
THOMAS W. CLEMENTS
BY
ATTORNEY.

Feb. 10, 1970     T. W. CLEMENTS     3,494,207
INTEGRATOR
Filed Jan. 31, 1968     2 Sheets-Sheet 2
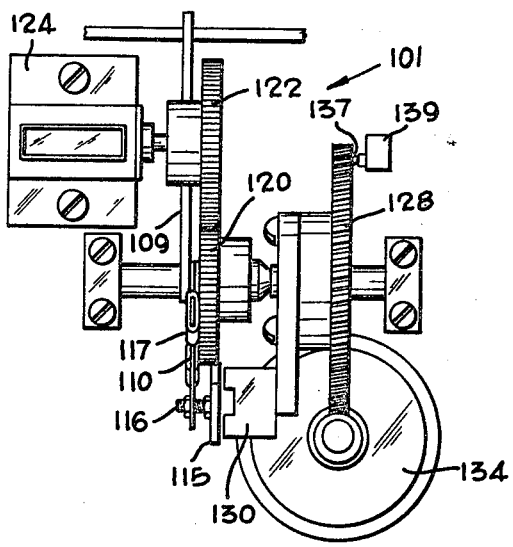
FIG. 7
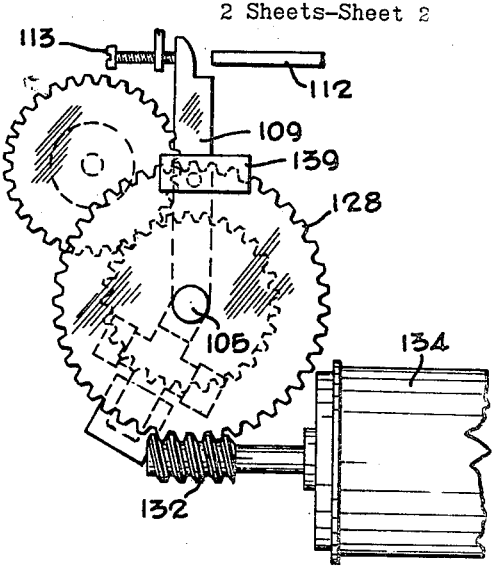
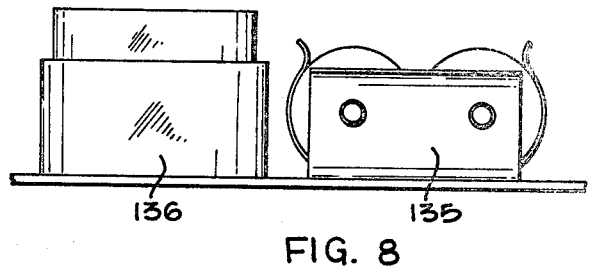
FIG. 8
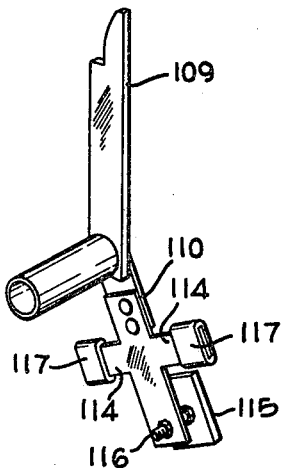
FIG. 9
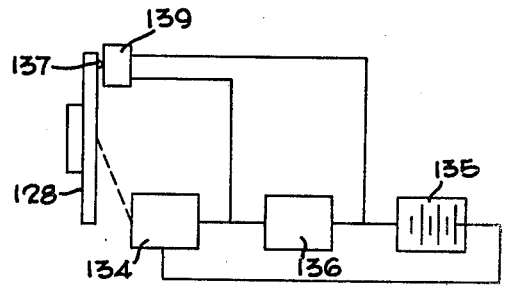
FIG. 10
Inventor
THOMAS W. CLEMENTS
By 
Attorney

United States Patent Office 3,494,207
Patented Feb. 10, 1970

3,494,207
INTEGRATOR
Thomas W. Clements, Ambler, Pa., assignor to Emerson Electric Co., St. Louis, Mo., a corporation of Missouri
Filed Jan. 31, 1968, Ser. No. 702,038
Int. Cl. F16d 27/10
U.S. Cl. 74—112         10 Claims

ABSTRACT OF THE DISCLOSURE

An integrator for mechanically sampling a rate input in the form of a displacement of a cam proportional to rate and generating an output in the form of a total. A counter-driving gear is driven by a frictional face of a magnetic block drawn to one face of the counter-driving gear by a permanent magnet adjacent the opposite face of the counter-driving gear. The permanent magnet is carried on a driven gear having the same axis of rotation as the counter-driving gear. The magnetic block is attached to a feeler arm, the motion of which is restricted by the input cam.

Background of the invention

This invention relates to a device for integrating rate with respect to time, known as an integrator or totalizer, and in particular to a stepless integrator.

Integrators of numerous types have long been used to determine and record a total with respect to time, of a rate input. The rate may be of any process, such as flow, temperature change or the like. In such integrators, a number of different types of rate dependent inputs, such as electrical inputs, mechanical motion, or mechanical position, and a large variety of outputs, driven either continuously or intermittently, may be used. This invention relates to an improved integrator of the type having a mechanical input the position of which is dependent on the rate being integrated and in which the position of the input is sampled at timed intervals and the output driven according to the position of the input. The term "cam" will be used herein to indicate any such mechanical input. Integrators of this type have generally been provided with toothed gears to avoid slippage inaccuracies, and a ratchet and pawl arrangement has been used to engage and release the gears driving the output. This type of mechanism yields totals which are really proportional to some number of teeth of the gear driven by the pawl. Therefore, a quantization error, which may become significant cumulatively, is introduced.

One of the objects of this invention is to provide a sampling type integrator having a stepless and highly accurate output.

Another object of this invention is to provide such an integrator which will exert little pressure on the input cam.

Still another object is to provide such an integrator which is easily adjusted for different applications.

Other objects will occur to those skilled in the art in the light of the following description and accompanying drawing.

Summary of the invention

In accordance with this invention, generally stated, an integrator is provided in which an output driver is mounted adjacent the first of a pair of magnetic pieces. Each magnetic piece includes a piece of magnetic material which is either a magnet or a material attracted by a magnet, and the pair comprise at least one magnet. The second magnetic piece is driven by a timed drive mechanism which brings the second piece of magnetic material into propinquity with the first piece of magnetic material at timed intervals. When the second piece of magnetic material is in propinquity with it, the first piece of magnetic material moves a frictional piece against the output driver and moves in response to the second magnetic piece until the movement of the first magnetic piece is halted by an input cam. When the second magnetic piece continues to move, the first magnetic piece biases the frictional face away from the output driving means and returns to a stop position. The output driving means is thus moved a distance precisely proportional to the displacement of the input cam from the stop position.

In the preferred embodiment, the second magnetic piece is a magnet mounted on a timer gear driven by a motor. The first magnetic piece includes a flexible arm which is securely connected to a feeler arm for engaging the input cam. The first and second magnetic pieces are mounted on opposite sides of the output driver, which is in the form of an output gear, and all are adapted to turn independently on the same fixed shaft. Also in the preferred embodiment the output driver moves a digital counter.

Brief description of the drawing

In the drawing.

FIGURE 7 is a view in side elevation, corresponding to FIGURE 3, of another illustrative embodiment of integrator of this invention;

FIGURE 8 is a sectional view, corresponding to FIGURE 5, of the integrator shown in FIGURE 7;

FIGURE 9 is a view in perspective of the first magnetic piece of the integrator shown in FIGURES 7 and 8; and FIGURE 10 is a circuit diagram showing the electrical system of the illustrative embodiment of integrator shown in FIGURES 7–9.

Description of the preferred embodiment

Figure 1:
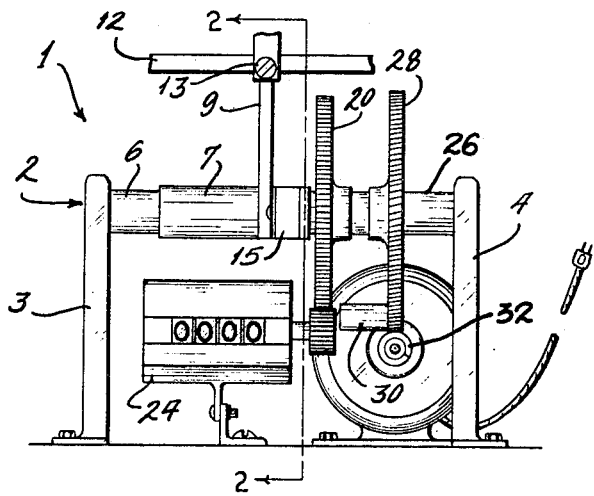
FIGURE 1 is a view in side elevation of one illustrative embodiment of integrator of this invention.

Referring now to the drawings, and in particular to FIGURES 1–6, reference numeral 1 indicates one illustrative embodiment of integrator of this invention. The integrator 1 includes a frame 2 including a pair of spaced support legs 3 and 4 and a fixed shaft 5 secured between upper ends of the legs 3 and 4. At a forward end of the shaft 5 a sleeve 7 is rotatably mounted on the shaft 5 between a fixed spacer 6 and a fixed spacer 8 on the shaft 5. Securely attached to the sleeve 7 are a feeler arm 9 and a resiliently flexible arm 10. The flexible arm 10 and feeler arm 9 are securely joined to each other at right angles. At its upper end, the feeler arm 9 is provided with a finger 11 adapted to engage an input cam 12. The input cam 12 is adapted to move laterally toward or away from the finger 11 in proportion to a rate sensed by a rate sensing means not shown. The cam 12 is so positioned that it abuts the finger 11 when the sensed rate is zero. The arm 9 is restrained from rotational movement in the opposite direction by a set screw 13. The face of the finger 11 adapted to engage the cam 12 is so contoured that the angular movement of the feeler arm between the set screw 13 and the cam 12 is always precisely proportional to the linear displacement of the cam 12. On the outer end of the flexible arm 10 is mounted a block of soft iron 15 to the face of which is secured a piece of frictional material 17.

Between the fixed spacer 8 and a fixed spacer 19 an output drive gear 20 is rotatably mounted on the shaft 5. The teeth of the gear 20 engage the teeth of a gear 22 of a standard digital counter 24.

Between the fixed spacer 19 and a fixed spacer 26 a timer 28 is rotatably mounted on the fixed shaft 5. The timer gear 28 carries a permanent magnet 30, the free end of which is slightly spaced from the rear face of the output drive gear 20. The timer gear 28 is continuously driven by a worm gear 32 on a synchronous electric motor 34 while the integrator is in operation.

Figure 5:
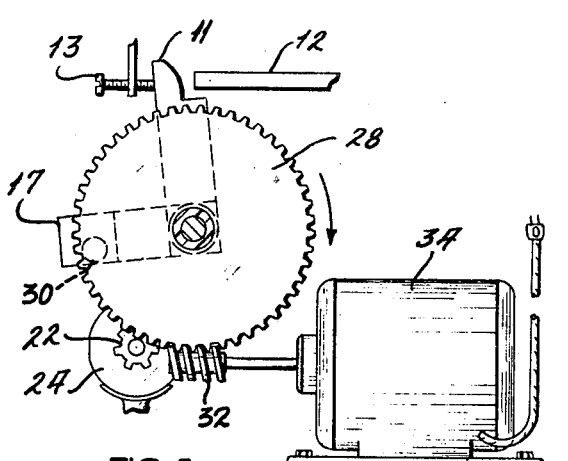
FIGURE 5 is a sectional view taken along the line 5—5 of FIGURE 3.
Figure 4:
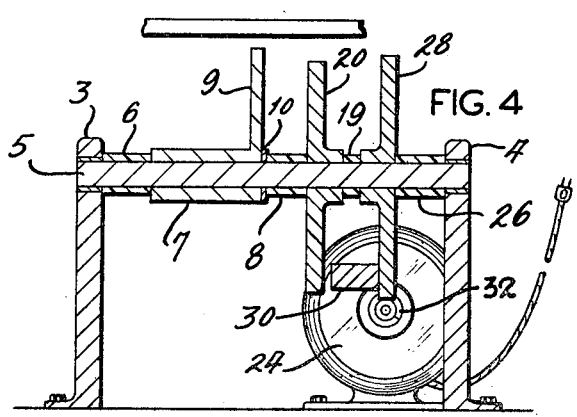
FIGURE 4 is a sectional view in side elevation taken through the center of the fixed axis of the device.
Figure 6:
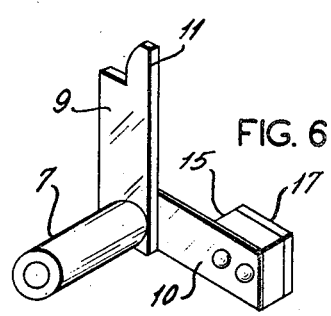
FIGURE 6 is a view in perspective of the first magnetic piece of the integrator shown in FIGURES 1–5.

In operation, the resiliently flexible arm 10 normally holds the frictional piece 17 spaced from the front face of the output drive gear 20, and the weight of the soft iron block 15 holds the feeler arm 9 against the set screw 13. When the integrator is turned on, the timer gear 28 is driven in a clockwise direction, as shown in FIGURE 5, by the motor 34. When the permanent magnet 30 reaches a point opposite the soft iron block 15, the soft iron block 15 is drawn toward the magnet 30 and the frictional piece 17 engages the output drive gear 20. The block of soft iron 15, carrying the output drive gear 20, follows the permanent magnet 30 until the finger 11 strikes the input cam 12. At this point the iron block 15 and the output drive gear 20 stop, and the magnet 30 continues until its attraction no longer overcomes the bias of the flexible arm 10. The flexible arm 10 then springs back, pulling the frictional material 17 away from the front face of the output drive gear 20, and the block 15 and arm 9 drop back to the stop position at which the arm 9 rests against the set screw 13.

Figure 2:
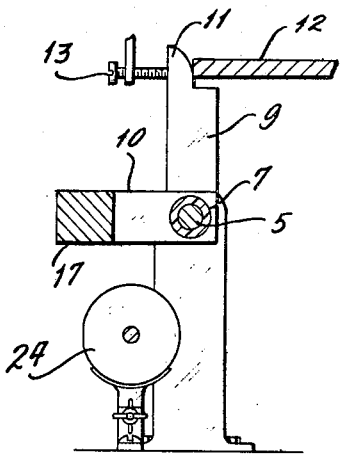
FIGURE 2 is a sectional view taken along the line 2—2 of FIGURE 1.
Figure 3:
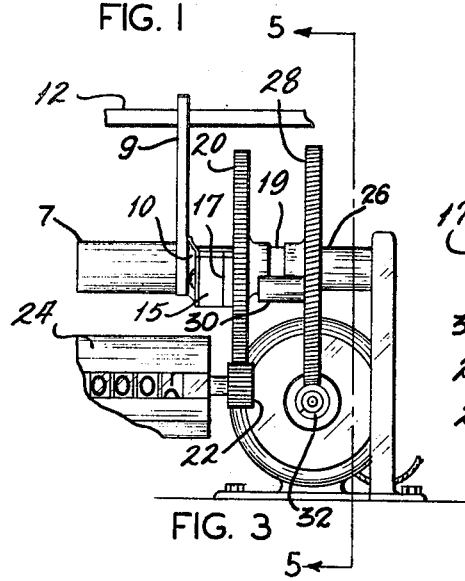
FIGURE 3 is a view in side elevation of the device shown in FIGURE 1, in which an adjustment screw has been loosened and a timer gear has been turned through slightly more than one revolution.

If, as shown in FIGURE 2, the input cam 12 abuts the finger 11 when the arm 9 is in the stop position, then no output is recorded on the counter 24. If, however, the adjustment of the set screw 13 and the position of the input cam 12 are such that the arm 9 moves before the finger 11 strikes the input cam 12, as shown in FIGURE 5, then the output gear 20 turns through an angle precisely proportional to the distance which the arm 9 moves.

It will be seen that the accuracy of the integrator of this invention is dependent only on the accuracy of the input cam position, the setting of the adjustable set screw 13 and the maintenance of a constant motor speed. It is not dependent on the precise position of the magnet 30 at which the frictional piece 17 is drawn against the output drive gear 20 or the precise instant at which the flexible arm 10 springs back into position. Because the engagement and disengagement of the frictional piece 17 with the output drive gear 20 are not affected by the position of the output gear 20, the output of the integrator 1 is truly stepless.

For less frequent sampling of the rate, and for conserving power, a timing means may be employed to activate the drive motor at timed intervals. The integrator 101 shown in FIGURES 7–10 is essentially identical with that shown in FIGURES 1–6, except that the synchronous motor of the first embodiment is replaced by a DC motor 134 powered by a battery pack 135 and activated at timed intervals by a clock switch 136, which is also powered by the battery pack 135. Modified magnetic pieces 115 and 130 and modified frictional pieces 117 are also provided.

The integrator 101 includes a fixed shaft 105 on which are rotatably mounted a feeler arm 109 and resilient arm 110, an output drive gear 120, and a timer gear 128.

The feeler arm 109, which is identical with the feeler arm 9 of the first embodiment, is adapted to rotate between a set screw 113 and an input cam 112 and is securely attached to the flexible arm 110 to form, in the illustrative embodiment shown, an obtuse angle with the arm. At its free end, the flexible arm 110 is provided with laterally extending arms 114 over which are mounted frictional pieces 117. Radially outboard of the frictional pieces 117, a block of soft iron 115 is mounted on the flexible arm 110, by means of an adjustment screw 116.

The output drive gear 120, which engages the teeth of a gear 122 of a standard digital counter 124, is of somewhat smaller diameter than the gear 20 of the first embodiment.

The timer gear 128 carries a permanent magnet 130, the free end of which is slightly spaced from, and radially outboard of, the output drive gear 120. The timer gear 128 is normally stationary, but is intermittently driven by a worm gear 132 on the motor 134.

The soft iron piece 115 also extends radially outboard of the output drive gear 120. When the magnet 130 moves into propinquity with the iron piece 115, the iron piece 115 is restrained from contacting the magnet 130 only by the contact of the frictional pieces 117 with the output drive gear 120 and by the adjustment of the screw 116.

In operation, the timer gear 128 is normally stationary at a position at which the magnet 130 has first moved into such propinquity with the iron piece 115 as to attract the iron piece 115 and hold the frictional piece 117 firmly against the output drive gear 120. At this position, the feeler arm 109 still abuts the set screw 113. At timed intervals, in the illustrative embodiment one minute intervals, the clock switch 136 briefly activates the motor 134. As the motor 134 turns the timer gear 128, a small lug 137 on the timer gear 128 breaks contact with a subminiature switch 139, thereby closing a holding circuit, electrically in parallel with the clock 136, through the switch 139. After the clock switch 136 opens, the motor 134 remains activated through the switch 139 until the timer gear 128 has made precisely one complete revolution. The lug 137 then makes contact with the subminiature switch 139, opens the switch 139 and deactivates the motor 134.

The second embodiment of integrator of this invention yields all of the advantages of the first embodiment except that its accuracy is dependent on the accuracy of the clock switch rather than on the speed of the drive motor. It has the additional advantages of not requiring as strong a magnet because the soft iron piece can be adjusted to a position nearer the magnet, of requiring less power, and of normally holding the output drive gear against accidental rotation caused by external vibrations.

Numerous variations in the construction of the integrator of this invention, within the scope of the appended claims, will become apparent to those skilled in the art in the light of the foregoing disclosure. For example, the magnetically attracting pieces may be reversed, or may both be magnets, with opposite poles facing. A spring may be provided to return the feeler arm to the stop position. These variations are merely illustrative.

Having thus described the invention, what is claimed and desired to be secured by Letters Patent is:

1. A device for integrating with respect to time a rate input from a cam, the position of said cam changing in response to a change in a rate, by periodically sampling the position of said cam, comprising a stop; a first magnetic piece trapped between said stop and said cam for movement betwen a rest position in contact with one of said stop and said cam to a sensing position in contact with the other of said stop and said cam, said first magnetic piece comprising a first piece of magnetic material; a second magnetic piece, said second magnetic piece comprising a second piece of magnetic material, at least one of said first piece of magnetic material and said second piece of magnetic material comprising a magnet; timing means for moving said second piece of magnetic material into propinquity with said first piece of magnetic material and for moving said first magnetic piece from said rest position to said sensing position while said second piece of magnetic material is in propinquity with said first piece of magnetic material, at timed intervals, and an output drive, said output drive being positioned to be driven by said first magnetic piece when said second piece of magnetic material is in propinquity with said first piece of magnetic material, whereby the distance travelled by said first magnetic piece at each timed interval is the instantaneous distance betwen said stop and said cam, and the distance travelled by said output drive at each timed interval is determined by the instantaneous position of said cam.

2. The device of claim 1 wherein the first magnetic piece comprises a frictional piece, said frictional piece being positioned to contact said output drive when said second piece of magnetic material is in propinquity with said first piece of magnetic material.

3. The device of claim 1 wherein the first magnetic piece and the second magnetic piece are positioned on opposite sides of said output drive.

4. The device of claim 3 wherein said output drive is a gear and said first magnetic piece, said gear, and said second magnetic piece are rotatably mounted about a common axis of rotation.

5. The device of claim 4 including a common shaft on which said first magnetic piece, said gear and said second magnetic piece are rotatably mounted.

6. The device of claim 1 wherein said timing means comprise an electric motor continuously moving said second piece of magnetic material at a constant rate.

7. The device of claim 1 wherein said second magnetic piece is normally stationary and said timing means moves said second magnetic piece at timed intervals.

8. The device of claim 2 wherein said first magnetic piece comprises a resiliently flexible arm, said first piece of magnetic material and said frictional piece being mounted on said resiliently flexible arm, said resiliently flexible arm biasing said frictional piece away from said output drive, and a feeler arm secured to said flexible arm at an angle, said feeler arm being trapped between said stop and said cam, said flexible arm biasing said feeler arm into contact with said stop.

9. A device for integrating with respect to time a rate input from a cam, the position of said cam changing in response to a change in a rate, comprising
  a frame;
  a shaft mounted on said frame;
  a stop spaced from said shaft;
  a first magnetic piece rotatably mounted on said shaft, said first magnetic piece comprising a flexible arm, a first piece of magnetic material mounted on said flexible arm, a frictional piece mounted on said flexible arm, and a feeler arm operatively secured to said flexible arm for rotation therewith;
  an output gear mounted on said shaft adjacent said first magnetic piece, said output gear being adapted to drive an indicator;
  a second magnetic piece rotatably mounted on said shaft on the axially opposite side of said output gear from said first magnetic piece, said second magnetic piece comprising a second piece of magnetic material; and
  timing means for rotating said second magnetic piece on said shaft in at least one direction of rotation, to bring said second piece of magnetic material into propinquity with said first piece of magnetic material at timed intervals,
  at least one of said first piece of magnetic material and said second piece of magnetic material comprising a magnet,
  said frictional piece being movable with said flexible arm into and out of driving engagement with said output gear,
  said flexible arm biasing said frictional piece out of engagement with said output gear,
  said first magnetic piece and said second magnetic piece being so positioned that said first piece of magnetic material moves axially toward said second piece of magnetic material against the bias of said flexible arm when said second piece of magnetic material is in propinquity with said first piece of magnetic material,
  said frictional piece being positioned to move into said driving engagement with said output gear when said first piece of magnetic material moves axially toward said second piece of magnetic material,
  said feeler arm being trapped between said stop and said cam and being rotatable through an arc from a rest position to a sensing position, said feeler arm contacting said stop in one of said rest position and said sensing position, and contacting said cam in the other of said rest position and said sensing position, said feeler arm being biased toward said rest position,
  whereby as said second magnetic piece rotates in said one direction said second piece of magnetic material rotates said first magnetic piece, hence said output gear, on said shaft in said one direction of rotation of said second magnetic piece when said second piece of magnetic material is in propinquity with said first piece of magnetic material and said timing means rotates said second magnetic piece, from said rest position of said feeler arm to said sensing position of said feeler arm,
  and as said second magnetic piece continues to rotate in said one direction of rotation until said second piece of magnetic material is out of propinquity with said first piece of magnetic material, said flexible arm moves said frictional piece out of engagement with said output gear, and said feeler arm returns in a direction of rotation opposite said direction of rotation of said second magnetic piece to its rest position, without turning said output gear.
  whereby the distance turned by said output gear each said timed interval is precisely determined by the distance from the stop of the cam.

10. A device for integrating with respect to time a rate input from a cam, the position of said cam changing in response to a change in a rate, by periodically sampling the position of said cam, comprising
  (A) an output drive for driving an indicator;
  (B) a first magnetic piece including a first piece of magnetic material, said first magnetic piece being movable from a rest position to a sampling position, the distance from said rest position to said sampling position being determined by the position of said cam, said first magnetic piece being biased into said rest position, at least a movable part of said first magnetic piece being movable from a spaced position spaced from said output drive to a drive engaging position in friction contact with said output drive, said movable part being biased into said spaced position;
  (C) magnetic means for moving said movable part of said first magnetic piece into said drive engaging position, thereafter moving said first magnetic piece from said rest position to said sampling position, while maintaining said movable part in said drive engaging position, thereafter moving said movable part out of said drive engaging position, and thereafter returning said flat magnetic piece to said rest position while said movable part is out of said drive engaging position, thereby moving said output drive a distance precisely dependent on the position of said cam, said magnetic means comprising
    (1) a second magnetic piece comprising a second piece of magnetic material, at least one of said first piece of magnetic material and said second piece of magnetic material being a magnet, said second magnetic piece being positioned to move magnetically said movable part of said first magnetic piece into said drive engaging position when said second piece of magnetic material is in propinquity with said first piece of magnetic material; and (2) timing means for moving said second piece of magnetic material into propinquity with said first piece of magnetic material and for moving said second piece of magnetic material in a first direction in propinquity with said first piece of magnetic material at timed intervals a distance greater than said distance from said rest position to said sensing position of said first magnetic piece, thereby moving said first magnetic piece, hence said output drive, said distance from said rest position to said sensing position and moving said second piece of magnetic material out of propinquity with said first piece of magnetic material while said first magnetic piece remains in said sensing position, said first piece of magnetic material being biased out of said drive engaging position and said first magnetic piece being biased into said rest position without moving said output drive in a direction opposite said first direction when said second piece of magnetic material is out of propinquity with said first piece of magnetic material.

References Cited

UNITED STATES PATENTS

| | | | |
|---|---|---|---|
| 2,806,533 | 9/1957 | Fleck | 74—125.5 |
| 2,954,859 | 10/1960 | Rabinow | 192—84 |
| 3,125,890 | 3/1964 | Dillon et al. | 74—125.5 |
| 3,283,588 | 11/1966 | Merchant | 192—84 |

FRED C. MATTERN, JR., Primary Examiner

WESLEY S. RATLIFF, JR., Assistant Examiner

U.S. Cl. X.R.

74—125.5; 192—84